United States Patent
Hentges

(10) Patent No.: US 7,914,078 B2
(45) Date of Patent: Mar. 29, 2011

(54) ADJUSTABLE LOWER SEAT FOR USE WITH A STAND AND LEAN TYPE BACKREST

(75) Inventor: John Hentges, Dubuque, IA (US)

(73) Assignee: Deere & Company, Moline, IL (US)

( * ) Notice: Subject to any disclaimer, the term of this patent is extended or adjusted under 35 U.S.C. 154(b) by 115 days.

(21) Appl. No.: 11/467,589

(22) Filed: Aug. 28, 2006

(65) Prior Publication Data

US 2007/0096526 A1    May 3, 2007

Related U.S. Application Data

(60) Provisional application No. 60/731,753, filed on Oct. 31, 2005.

(51) Int. Cl.
*B60N 2/02* (2006.01)
(52) U.S. Cl. .......... 297/335; 297/334; 297/331
(58) Field of Classification Search .......... 297/14, 297/331, 335, 334, 311
See application file for complete search history.

(56) References Cited

U.S. PATENT DOCUMENTS

| | | | |
|---|---|---|---|
| 1,664,958 A * | 4/1928 | Zeiser ..................... 297/335 |
| 3,131,964 A * | 5/1964 | Reed ....................... 297/13 |
| 3,744,843 A * | 7/1973 | Barecki et al. ........... 297/316 |
| 4,632,457 A * | 12/1986 | Hofrichter et al. ........ 297/335 |
| 5,265,689 A * | 11/1993 | Kauffmann ............... 180/65.5 |
| 5,775,655 A * | 7/1998 | Schmeets ................. 248/240 |
| 6,189,964 B1 * | 2/2001 | Henshaw et al. .......... 297/112 |
| 6,224,153 B1 * | 5/2001 | Vodinh .................... 297/331 |
| 6,527,341 B1 * | 3/2003 | Martin ..................... 297/332 |
| 6,692,076 B1 * | 2/2004 | Burer ....................... 297/331 |
| 6,729,685 B1 * | 5/2004 | Ebalobor ................... 297/14 |
| 6,783,179 B2 * | 8/2004 | Komura et al. ........... 297/344.12 |
| 7,047,716 B2 * | 5/2006 | Lang ......................... 56/16.7 |
| D536,889 S * | 2/2007 | Self et al. ................. D6/362 |
| 2007/0035166 A1 * | 2/2007 | Summerford ............. 297/331 |

FOREIGN PATENT DOCUMENTS

GB    2209276 A  *  5/1989

* cited by examiner

*Primary Examiner* — Sarah B McPartlin
(74) *Attorney, Agent, or Firm* — Baker & Daniels LLP

(57) ABSTRACT

A seat for use with a vehicle providing multiple positions for a member including a substantially horizontal position and a substantially vertical position. The adjustor is designed to adjust and/or support the member in multiple positions. The member is configured to maximize seat area within seating limitations. The seat is also designed to provide support for the operator when the operator uses the control lever on the rear of the seat.

28 Claims, 5 Drawing Sheets

ADJUSTABLE LOWER SEAT FOR USE WITH A STAND AND LEAN TYPE BACKREST

This application claims the benefit of U.S. Provisional Patent Application Ser. No. 60/731,753 filed Oct. 31, 2005, the complete disclosure of which is hereby expressly incorporated by reference.

BACKGROUND OF THE INVENTION

The present invention generally relates to seats, and, more particularly, to a stand up or lean seat for use with a vehicle.

SUMMARY OF THE INVENTION

The present invention provides a seat that has a member which is configured to pivotally move between a substantially horizontal position and a substantially vertical position.

The invention comprises, in one form thereof, a seat for use with a vehicle. The seat includes a member configured to pivot between a substantially horizontal position and a substantially vertical position. The seat also includes a frame pivotally coupled to the member. The seat further includes an adjustor operably coupled to the member and the frame where the adjustor is configured to support the member at a plurality of positions between the substantially horizontal position and the substantially vertical position.

The invention comprises, in another form thereof, a seat including a member configured to angularly pivot between a substantially horizontal position and a substantially vertical position. The seat also includes a frame pivotally coupled to the member and an adjustor supported by the frame where the adjustor supports the member at a plurality of angular positions between the substantially horizontal position and the substantially vertical position.

The invention comprises, in yet another form thereof, a seat for use with a vehicle. The seat includes a member configured to pivot between a substantially horizontal position and a substantially vertical position. The seat also includes a frame and a backrest where the backrest is operably coupled to either the frame or the member. The seat further includes an adjustor operably coupled to the member and the frame where the adjustor is configured to support the member and the backrest at a plurality of positions including the substantially horizontal position.

An advantage of the present invention is that the member allows the operator to select ergonomically comfortable support from multiple angular positions.

Another advantage is that the member is configured to take a substantially vertical position. The substantially vertical position allows the operator to assume a full standing position or leaning position while operating controls to the rear of the seat.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Figure 1:
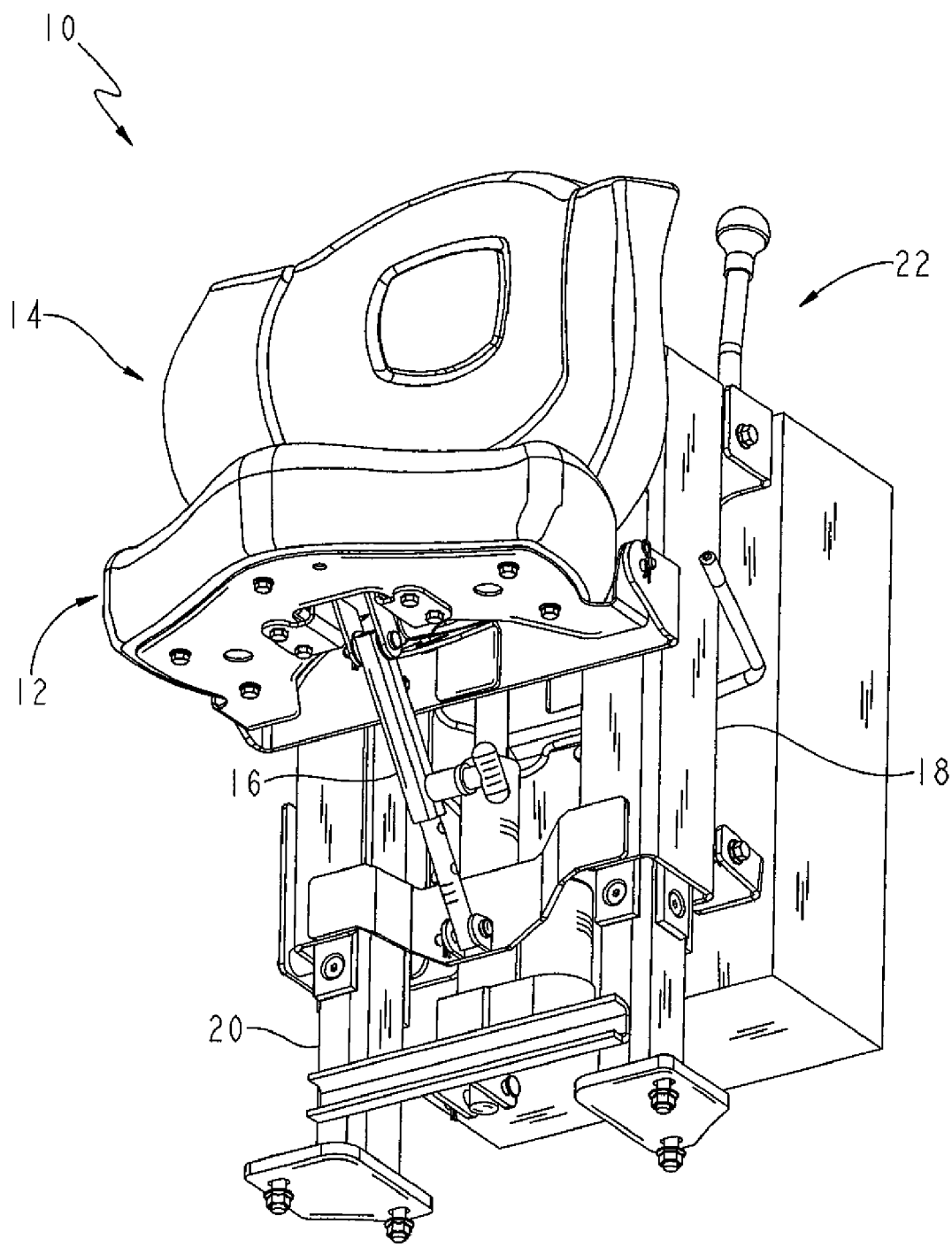
FIG. 1 is a perspective view of the seat with the member in a substantially horizontal position.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Referring to FIG. 1, seat 10 including member 12, adjustor 16 and frame 18 is shown. Member 12 is shown in a substantially horizontal position pivotally coupled to adjustor 16 and pivotally coupled to frame 18. Optionally, seat 10 includes backrest/chest rest 14 and base 20, as shown in FIG. 1. Backrest/chest rest 14 is coupled to frame 18. Frame 18 is slidably coupled to base 20, as discussed in more detail below. FIG. 1 also shows control lever 22, which is discussed in more detail below, coupled to frame 18.

Figure 2:
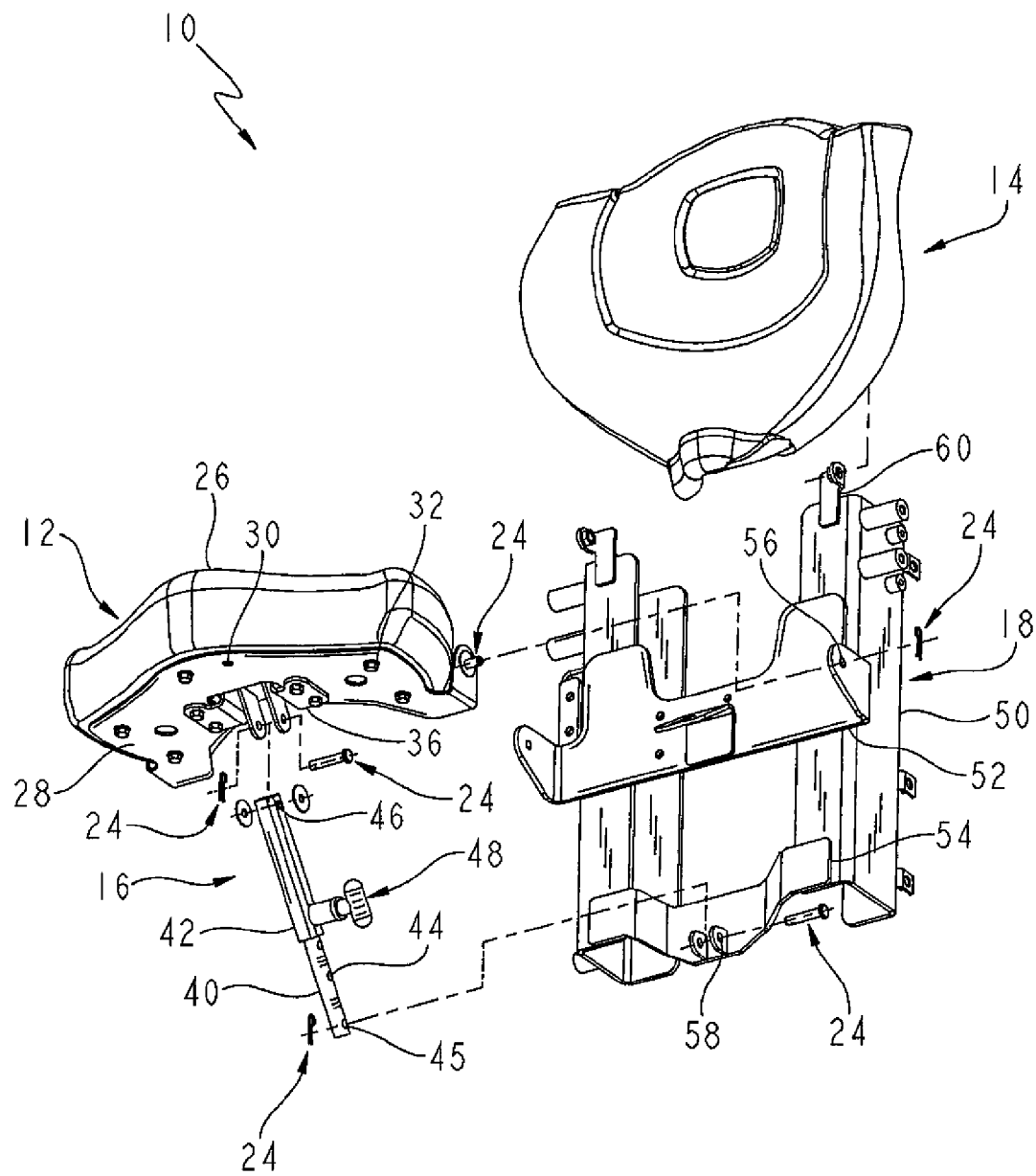
FIG. 2 is an exploded view of the seat of FIG. 1.

As illustrated in FIG. 2, pin style locks 24 or any other suitable fasteners pivotally couple member 12 to each adjustor 16 and frame 18. Member 12 includes seat cushion portion 26 and seat frame 28. Seat frame 28 defines apertures 30 through which screws 32 or any other suitable fasteners couple seat frame 28 to seat cushion portion 26. As shown in FIG. 2, seat frame 28 includes seat fastener 36 which pivotally couples member 12 to adjustor 16.

Still referring to FIG. 2, adjustor 16 includes rod 40 and tube 42. Rod 40 defines a plurality of locking apertures 44 spaced linearly along the longitudinal axis of rod 40. Rod 40 defines fastener apertures 45 through which pin style locks 24 or any other suitable fasteners pivotally couple adjustor 16 to frame 18. Tube 42 defines member apertures 46 and includes spring loaded pull pin lock 48 or any other suitable fastener. Locking apertures 44 are configured to align with pin lock 48. Pin lock 48 is configured to be disposed within locking apertures 44.

Still referring to FIG. 2, frame 18 includes base 50, seat fastener 52 and adjustor fastener 54. Seat fastener 52 and adjustor fastener 54 are coupled to base 50. Seat fastener 52 defines apertures 56 through which pin style locks 24 or any other suitable fasteners pivotally couple member 12 to frame 18. Adjustor fastener 54 defines adjustor apertures 58 through which pin style locks 24 or any other suitable fasteners pivotally couple adjustor 16 to frame 18. Optionally, frame 18 includes backrest/chest rest fastener 60. Fastener 60 pivotally couples backrest/chest rest 14 to frame 18.

Figure 3:
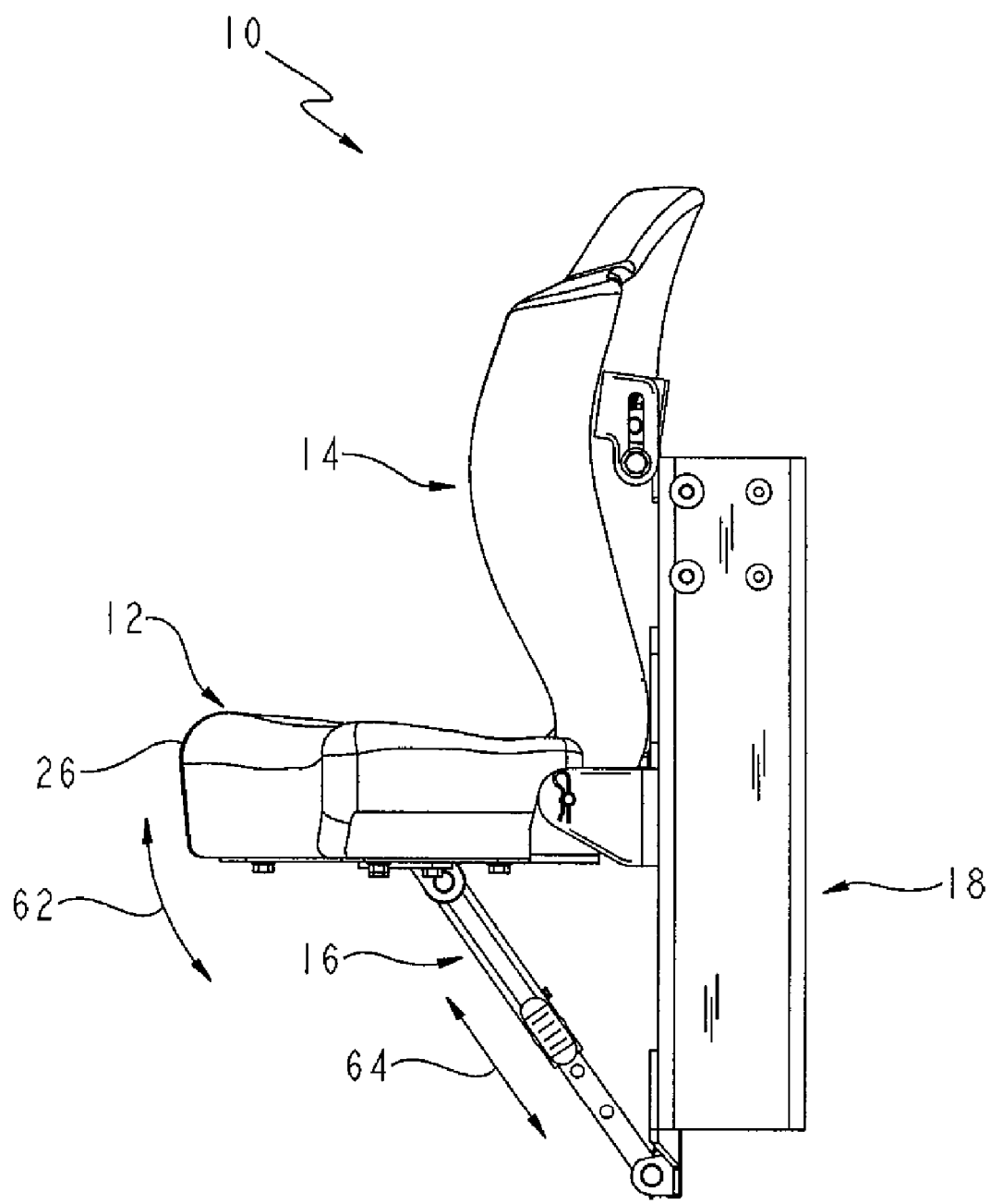
FIG. 3 is a side perspective view of the seat of FIG. 1.

As illustrated in FIG. 3, member 12 is configured to pivot downward or upward along member bi-directional arrow 62 while adjustor 16 is configured to linearly expand or contract along adjustor bi-directional arrow 64. When removing the spring loaded pull pin lock 48 or any other suitable fastener from any locking aperture 44, member 12 can pivotally rotate from a substantially horizontal position to a substantially vertical position. When member 12 pivotally rotates downward along member bi-directional arrow 62, adjustor 16 linearly contracts along adjustor bi-directional arrow 64. When member 12 pivotally rotates upward, adjustor 16 linearly expands along adjustor bi-directional arrow 64.

Still referring to FIG. 3, when disposing spring loaded pull pin lock 48 or any other suitable fastener into any locking aperture 44, adjustor 16 supports member 12. Depending upon the plurality of locking apertures 44 in which the pin lock 48 is disposed, the member 12 can take one of a plurality of pivotal positions including a substantially horizontal position and a substantially vertical position. While adjustor 16 illustrates pin lock 48 in locking apertures 44, alternative adjustment means are contemplated, such as hydraulic cylinders, a ratchet or winch adjustor, or pneumatic cylinders.

Figure 4:
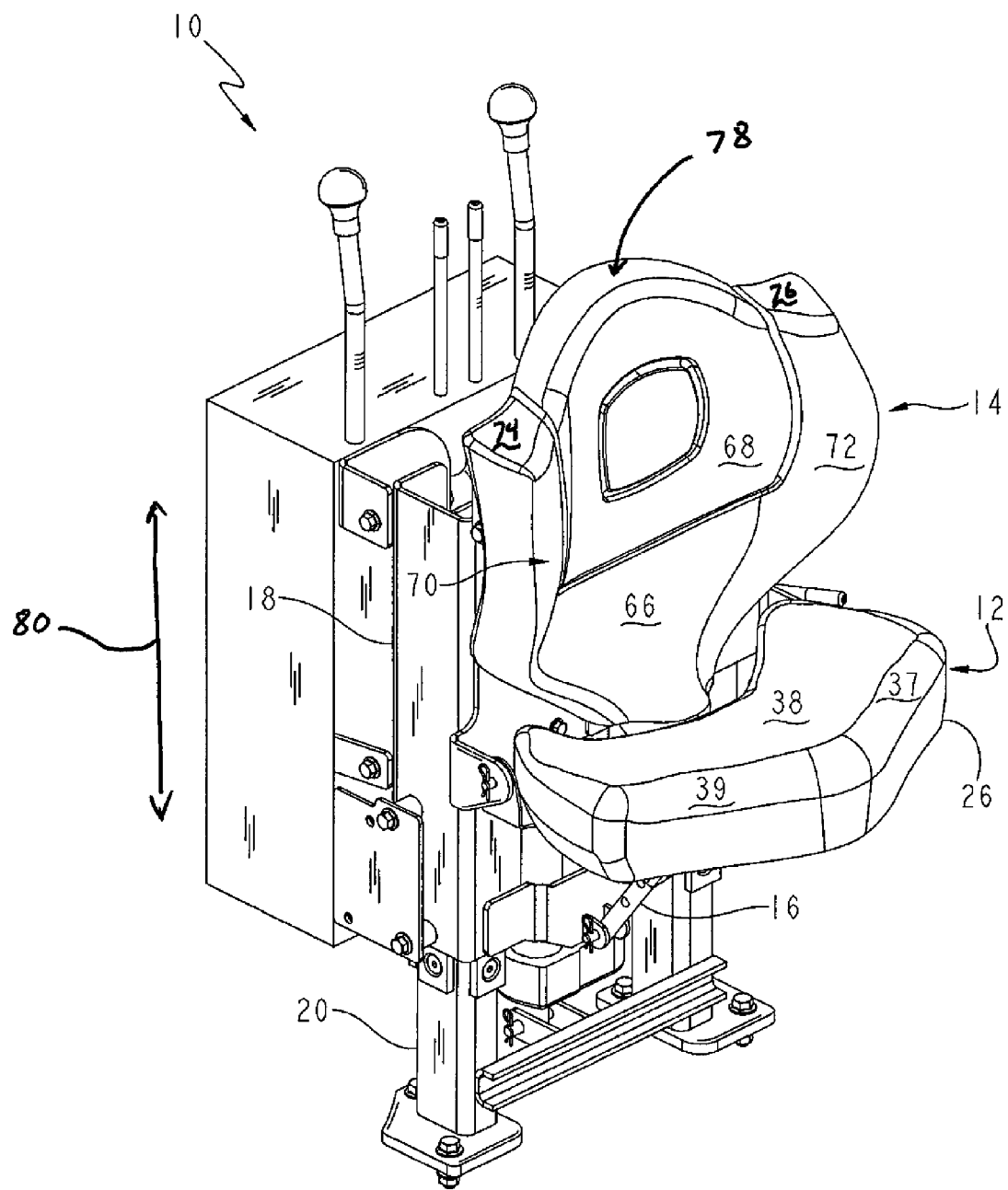
FIG. 4 is another perspective view of the seat of FIG. 1.

As illustrated in FIGS. 3 and 4, seat cushion portion 26 is slightly angled up to keep the operator from sliding forward or off of seat 10. As shown in FIG. 4, the seat cushion portion 26 has a contoured v-shaped form which allows the operator to select ergonomically comfortable support at multiple positions of member 12. Seat cushion portion 26 defines main contour 38 which is shaped to provide ergonomically comfortable seating for the operator. Seat cushion portion 26 also defines thigh contours 37 and 39. Thigh contours 37 and 39 are shaped to provide clearance for the legs of the operator. As previously mentioned, frame 18 is slidably coupled to base 20. Seat 10 is also configured to linearly adjust (for example, raise or lower) frame 18 in relation to base 20 along seat bi-directional arrow 80.

Figure 5:
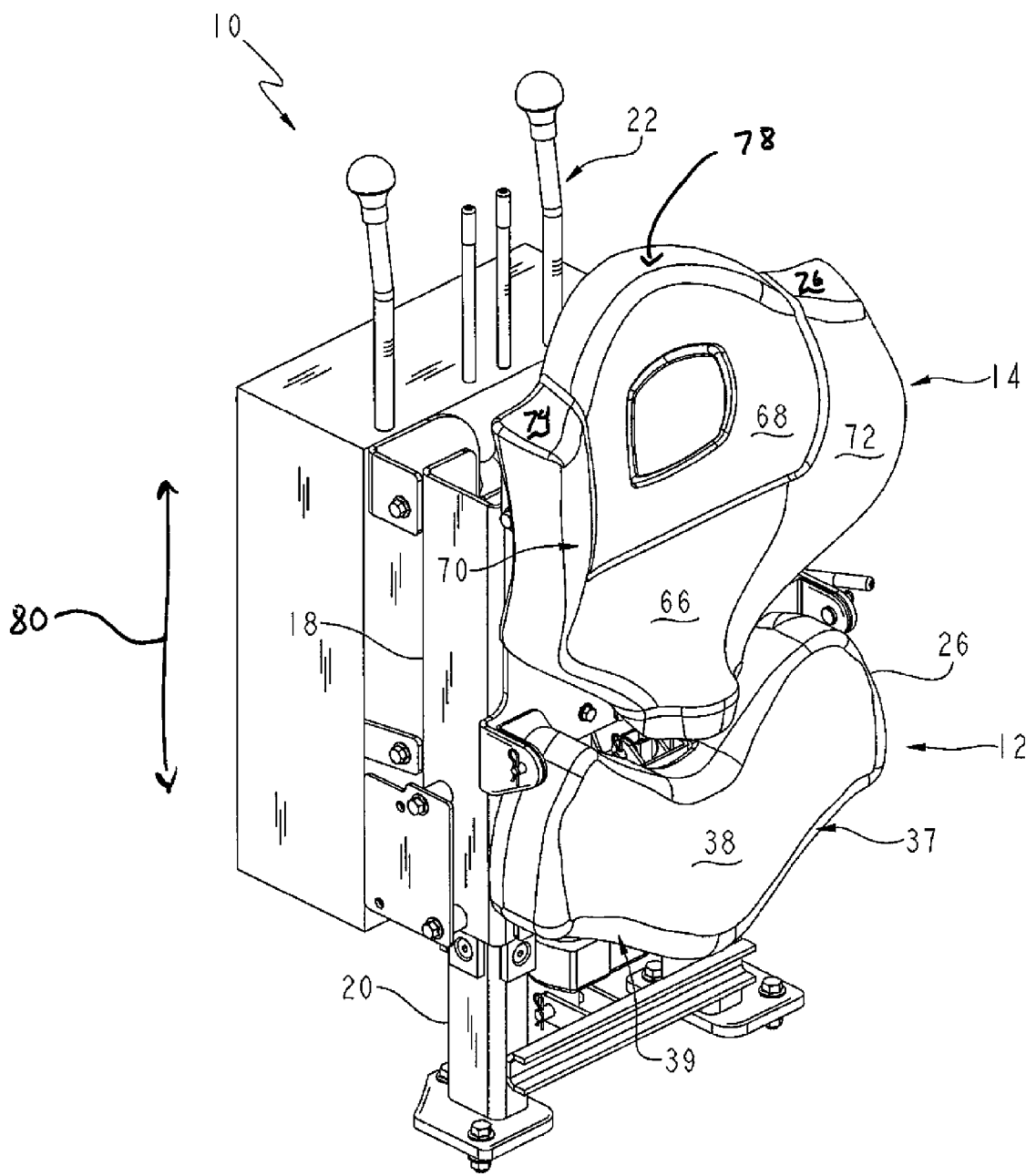
FIG. 5 is another perspective view of the seat of FIG. 1 with the member in a substantially vertical position.

Referring to FIGS. 4 and 5, the v-shaped form of member 12 also provides clearance between member 12 and backrest/chest rest 14 whether member 12 is in any position from substantially horizontal to substantially vertical. As illustrated in FIG. 5, seat cushion portion 26 is also configured to provide maximum seat area without colliding with base 20 when member 12 is in a substantially vertical position.

Still referring to FIG. 5, when member 12 is in a substantially vertical position, operator may face or lean against seat 10 while operating control lever 22. Backrest/Chest rest 14 is configured to support the chest of an operator. Backrest/chest rest 14 defines lower contour 66, main contour 68, side contours 70 and 72, side support contours 74 and 76 and arch contour 78. Contours 66, 68, 70, 72 and 78 are configured to provide ergonomically comfortable support whether the operator is facing towards or away from backrest/chest rest 14. Main contour 68 is configured to support the operator whether the operator is facing towards or away from backrest/chest rest 14. Main contour 68 and lower contour 66 are shaped to provide ergonomically comfortable support for the operator. Lower contour 66 and side contours 70 and 72 are configured to provide clearance between member 12 and backrest/chest rest 14 whether member 12 is in any position from substantially horizontal to substantially vertical. Side contours 70 and 72 are arcuate in form to provide additional support for operator whether the operator is facing towards or away from backrest/chest rest 14.

Yet still referring to FIG. 5, side support contours 74 and 76 are configured to provide ergonomically comfortable support when the operator is facing towards backrest/chest rest 14. Side support contours 74 and 76 are also configured to provide clearance when the operator is facing towards backrest/chest rest 14 and/or operating control lever 22. Side support contours 74 and 76 are also shaped to provide ergonomically comfortable support for the elbows, arms or forearms of the operator. Arch contour 78 is configured to maximize ergonomically comfortable support when the operator is facing towards backrest/chest rest 14.

Backrest/chest rest 14 is configured to pivot in relation to frame 18 in order to provide ergonomically comfortable support for an operator. As previously mentioned, frame 18 is slidably coupled to base 20. Frame 18, and therefore backrest/chest rest 14, is also configured to linearly adjust (for example, raise or lower) in relation to base 20 along seat bi-directional arrow 80. Arch contour 78 is also configured to maximize ergonomically comfortable support when backrest/chest rest 14 is in a plurality of pivotal positions in relation to frame 18.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seat for use with a vehicle comprising:
a frame slidably coupled to a base of the vehicle to permit vertical adjustment of the frame relative to the base,
a seat member pivotally coupled to and supported by the frame at a first pivot point to permit vertical adjustment of the seat member relative to the base independent of vertical adjustment of the frame relative to the base, the seat member being configured to pivot about the first pivot point between a substantially horizontal position, in which the seat member provides a forward facing seat configuration, and a substantially vertical position independent of the vertical adjustment of the frame relative to the base; and
an adjustor pivotally coupled directly to the seat member and to the frame at a second pivot point located rearward of the first pivot point, the adjustor configured to support the seat member at a plurality of positions between the substantially horizontal position and the substantially vertical position.

2. The seat of claim 1, wherein the adjustor converts pivotal movement of the member into linear movement of the adjustor.

3. The seat of claim 1, further comprising a support member as a pivoting backrest coupled to the frame, the backrest configured to provide support to an operator.

4. The seat of claim 1 further comprising a control supported by the frame.

5. The seat of claim 1 further comprising an operator support configured to provide ergonomically comfortable support for elbows, arms, or forearms of an operator.

6. The seat of claim 1, further comprising:
a support member pivotally coupled to the frame, the support member defining a rearward surface adjacent to the frame, the support member defining a forward surface opposite the rearward surface, and
an operator control member located on the frame, the operator control member located adjacent to the rearward surface, at least a portion of the frame being between the rearward surface and the operator control member.

7. The seat of claim 6, wherein the forward surface defines a plurality of contours.

8. The seat of claim 7, wherein the plurality of contours include an arch contour.

9. The seat of claim 1, further comprising a support member coupled to the frame and an operator control member coupled to the frame, wherein the support member is located rearward of the seat member when the seat member is in the substantially horizontal position and the operator control member is located rearward of the support member.

10. A vehicle operator assembly comprising:
an operator control; and
a seat for use with a vehicle, the seat comprising:
   a frame;
   an operator support coupled to the frame and located forward of the operator control, the operator support positioned in a substantially vertical position;
   a seat member having a top side and a bottom side, the seat member being configured to angularly pivot between a substantially horizontal position and a substantially vertical position, the seat member being pivotally coupled to and supported by the frame, the operator support located vertically between the seat member and the operator control; and
   an adjustor supported by the frame, the adjustor being coupled to the bottom side of the seat member to support the seat member at a plurality of angular positions between the substantially horizontal position and the substantially vertical position,
      wherein when the seat member is in the substantially horizontal position, the operator support and the seat member cooperate to define a seat configuration with the operator support defining a backrest and the top side of the seat member defining a seat bottom, and the top side of the seat member is located vertically above the adjustor,
      wherein when the seat member is in the substantially vertical position, the operator support defines a chest rest and the seat member is configured to provide clearance for the lower body of an operator.

11. The assembly of claim 10, wherein the backrest is configured to support an operator.

12. The assembly of claim 10, wherein the adjustor converts pivotal movement of the member into linear movement of the adjustor.

13. The assembly of claim 10 wherein the chest rest supports an operator while the operator operates the control.

14. The assembly of claim 10 wherein the chest rest is configured to provide ergonomically comfortable support for elbows, arms, or forearms of an operator while the operator operates the control.

15. The assembly of claim 10, wherein the operator support is located rearward of the seat member when the seat member is in the substantially horizontal position and the operator control is located rearward of the operator support.

16. A seat for use with a vehicle comprising:
   a frame slidably coupled to and supported by a base of the vehicle to permit vertical adjustment of the frame at a plurality of locations including a raised position relative to the base and a lowered position relative to the base;
   a control supported by the frame for vertical movement therewith;
   a seat member configured to pivot between a substantially horizontal position and a substantially vertical position;
   an operator support located rearward of the seat member when the seat member is in the substantially horizontal position and forward of the control, the operator support being a chest rest for an operator with the frame in the raised position and the seat member in the substantially vertical position, wherein the chest rest supports the chest of the operator while the operator operates the control, the operator support being a backrest for the operator with the frame in the lowered position and the seat member in the substantially horizontal position; and
   an adjustor operably coupled to the seat member and the frame, the adjustor being configured to support the seat member at a plurality of positions including the substantially horizontal position and the substantially vertical position.

17. The seat of claim 16 wherein the adjustor includes a rod and a tube, where the rod defines a plurality of holes spaced apart along the longitudinal axis of the rod, where the tube includes a pin lock configured to lock into any one of the plurality of holes.

18. The seat of claim 17, wherein the pin lock is a spring loaded pull pin lock.

19. The seat of claim 17, wherein the adjustor converts pivotal movement of the member into linear movement of the tube.

20. The seat of claim 16, wherein the adjustor is a hydraulic cylinder, a ratchet, a winch, or a pneumatic cylinder.

21. The seat of claim 16, wherein the operator uses the chest rest.

22. The seat of claim 16, wherein the adjustor is pivotally coupled to the frame.

23. The seat of claim 16 wherein the member includes a substantially v-shaped seat cushion.

24. The seat of claim 16, wherein the frame permits vertical adjustment of the control at a plurality of locations including a raised position relative to the base and a lowered position relative to the base.

25. A vehicle operator assembly comprising:
an operator control; and
a seat for use with a vehicle having a front end and a rear end, the seat comprising:
   a frame;
   an operator support coupled to the frame, the operator support positioned in a substantially vertical position, the operator support having a front surface facing the front end of the vehicle;
   a seat member being configured to angularly pivot about a first pivot point between a substantially horizontal position and a substantially vertical position, the seat member being pivotally coupled to and supported by the frame at the first pivot point, the operator support located between the seat member and the operator control, wherein when the seat member is in the substantially horizontal position, at least a majority of the seat member is forward of the operator support and the operator control is rearward of the operator support; and
   an adjustor supported by the frame and pivotally coupled to the frame at a second pivot point located rearward of the first pivot point, the adjustor supporting the seat member at a plurality of angular positions between the substantially horizontal position and the substantially vertical position,
      wherein when the seat member is in the substantially horizontal position, the operator support and seat member cooperate to define a seat configuration with the front surface of the operator support defining a backrest and the seat member defining a seat bottom to support an operator while operating the vehicle in a seated position facing the front end of the vehicle,
      wherein when the seat member is in the substantially vertical position, the front surface of the operator support defines a chest rest and the seat member is configured to provide clearance for the lower body of the operator while operating the operator control in a standing position facing the rear end of the vehicle.

26. The assembly of claim 25, wherein the operator control is located on the frame.

27. The assembly of claim 25, wherein the operator control is located adjacent to the rearward surface of the operator support.

28. The assembly of claim 27, wherein at least a portion of the frame is located between the rearward surface and the operator control.

* * * * *